United States Patent [19]

Ambros et al.

[11] 3,708,955
[45] Jan. 9, 1973

[54] METHOD FOR DRYING GASES

[75] Inventors: Rafael Foguet Ambros, Flix, Spain; Alexander Beerwald, Frankfurt/Main; Arnold Lang, Marburg/Lahn, both of Germany

[73] Assignee: Electro-Quimica de Flix S.A., Barcelona, Spain

[22] Filed: Sept. 9, 1968

[21] Appl. No.: 758,520

[30] Foreign Application Priority Data

Sept. 9, 1967 Spain.....................................344914

[52] U.S. Cl. .........................55/31, 55/63, 55/89, 55/94
[51] Int. Cl. .............................................B01d 47/06
[58] Field of Search........................55/29–31, 63, 80, 55/89, 93, 94, 195

[56] References Cited

UNITED STATES PATENTS

| | | |
|---|---|---|
| 1,740,248 | 12/1929 | Klaiber.....................................55/31 |
| 2,235,322 | 3/1941 | Martin......................................55/31 |
| 2,796,448 | 6/1957 | Root......................................55/63 X |
| 2,805,734 | 10/1957 | Riess et al. ..............................55/31 |
| 3,225,517 | 12/1965 | Wachsmuth............................55/31 |

*Primary Examiner*—John Adee
*Attorney*—Curtis, Morris & Safford

[57] ABSTRACT

A method for drying wet industrial gases by contacting them with a refrigerated inorganic brine is shown. The wet gas is contacted with cold brine and water vapor is condensed from the gas into the brine. In a preferred method, two stages of gas-liquid contact are employed to produce a particularly dry gas product. Brine used in the first contacting zone is heat exchanged with colder brine used in the second contacting zone; and, if desired, it may be heat exchanged with dry cold gas product from the second zone before recycle to the first zone. Brine from the second zone is subjected to refrigeration before recycle to the second zone. Drying is carried out in conventional packed towers, at low pressure, and does not require system regeneration or replacement of expensive adsorbents.

6 Claims, 1 Drawing Figure

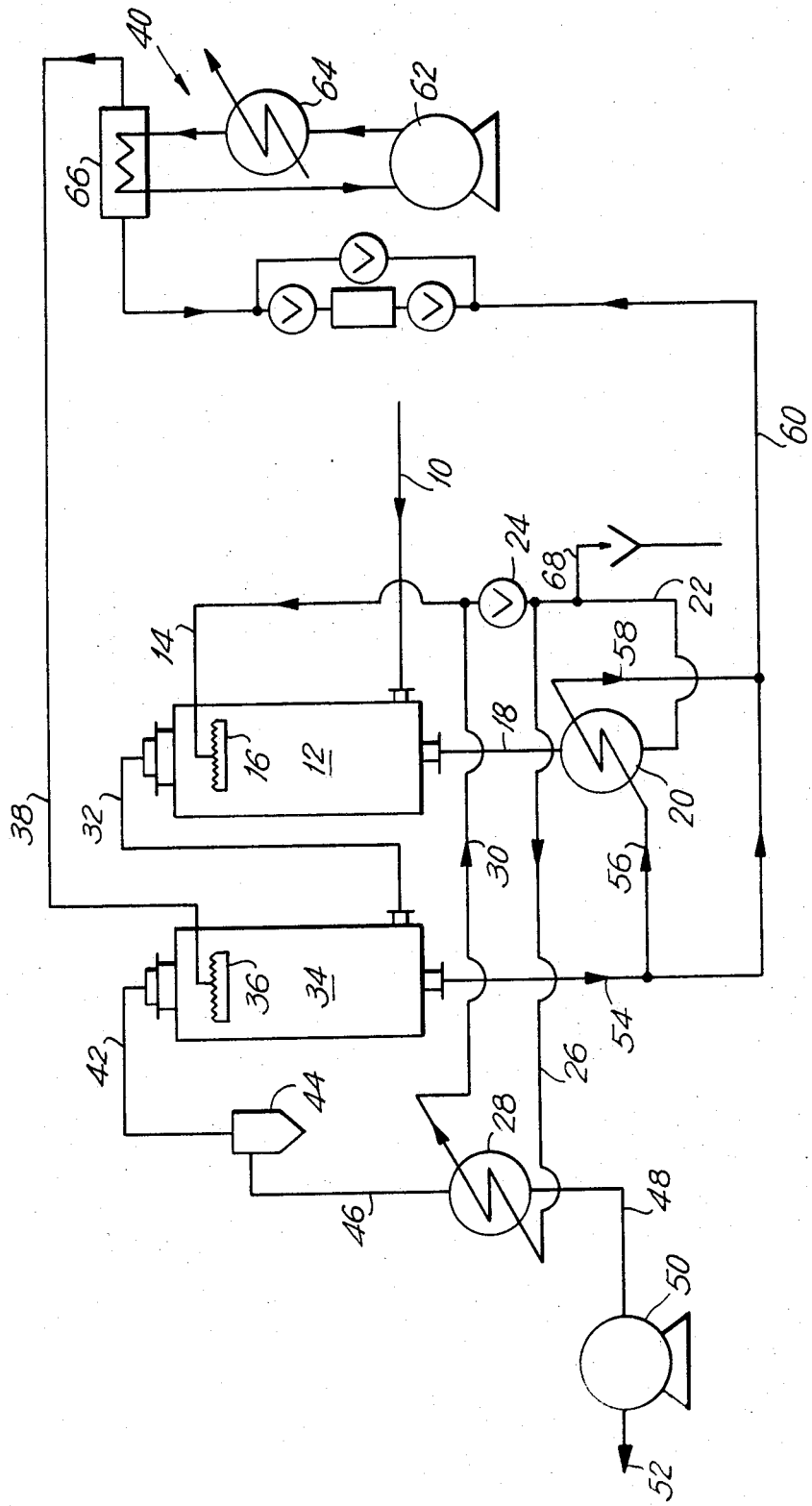

METHOD FOR DRYING GASES

This invention relates to a method for drying industrial gases. More specifically, it relates to a method whereby the water vapor in a gas stream is condensed and removed from the gas stream by contact with a refrigerated brine to which the gas is inert. More specifically, it relates to a thermally efficient, two stage gas-liquid contacting operation which produces a dry gaseous product safely and economically.

There are numerous occasions in chemical processing, and industrial operations, when it is necessary to remove substantially all of the water in a gas stream. Many processes use water in the generation or purification of various gases and the water must first be removed before further processing is possible. Water may cause corrosive mixtures to form; or moisture in the gas may be harmful to a reaction by causing secondary reactions to occur, by deleteriously affecting a catalyst or by inhibiting the desired reaction and causing inefficient conversion of raw material.

A specific example of an industrial gas which must be thoroughly dried prior to use in chemical reactions is acetylene. Acetylene gas is generated from calcium carbide and water and commonly leaves the generating and washing plant saturated with moisture at a temperature slightly above ambient. To use the acetylene in the manufacture of chlorinated monomers, or chlorinated solvents, e.g. vinyl chloride, it is necessary to reduce the water content of the gas to less than 200 mg/m$^3$. If a gas with substantial water content is employed, the residual gas from the reaction zone may contain explosive quantities of unreacted acetylene.

A number of gas drying processes are available. Chemical desiccants such as caustic soda or calcium chloride are commonly used. In other processes the wet gas is passed through towers packed with silica gel, alumina or molecular sieves. Conventional refrigeration processes wherein the gas is compressed and refrigerated to cause the water to condense are also common, especially for partial drying.

In the methods referred to and in combinations of those methods, there are drawbacks. In processes which employ solid adsorbents, it is necessary to have two separate trains of equipment so that one train can be regenerated without causing a disruption in a continuous process. In these processes it is necessary to take expensive precautions during the equipment purge which precedes a regeneration. Air or inert gases must be used to flush the system, special controls are necessary, and valuable product is occasionally lost in the purge stream. Often regeneration processes entail additional consumption of energy to heat streams of inert gas or air. Still further, the use of adsorbents causes variation in the water content of the dried gas; when the desiccant is almost spent, the effectiveness of the drying decreases and, until regeneration, the product moisture content may be higher than normal.

Some drying processes incorporate several of the unit operations described above. For example, partial refrigeration can precede a final drying with an adsorption medium. Such systems are effective, but a relatively high investment is required and maintenance and operating costs are high.

It is thus a primary objective of this invention to provide a gas drying process which requires relatively low capital investment and low operating cost.

It is a further objective of this invention to provide a safe, simple operation whereby gases can be effectively dried to a consistently low water content.

It is a further objective of this invention to accomplish this drying with inexpensive, readily available materials which do not require replacement, regeneration or other complicated handling.

These and other objectives of this invention have been achieved in a drying process, based on a single unit operation, which permits industrial gases to be dried to moisture contents of less than 100 mg/m$^3$. A stream of wet gas is thoroughly contacted with an inorganic brine to which the gas is inert. The brine cools the gas and causes moisture contained therein to condense into the brine; the cooled and dried gas is then removed from the contact zone.

Preferably this method is carried out continuously by feeding separate gas and brine streams to a contact zone and causing them to pass countercurrently in intimate mixture. The dried and cooled gas and the brine which contains sensible heat from the gas stream as well as the heat of condensation of the moisture, are continuously and separately removed from the contacting zone. The brine stream, which is more dilute than the feed to the contacting zone, must be restored to its original strength lest it be so diluted that it no longer is useful for low temperature operation. Obviously, where the amount of moisture condensed is small, the brine need not be continuously reconcentrated and infrequent addition of concentrated brine to the system is sufficient to maintain satisfactory low temperature performance. Diluted brine must be purged from the system to maintain a constant inventory. Finally, to maintain continuous low temperature operation, the brine stream must be cooled in a refrigerator or other low temperature source.

The brine inlet temperature to the contacting zone depends on the degree to which the wet gas must be dried; the particular moisture specifications of each chemical or industrial process therefore dictate operating temperature. It should be evident that the vapor pressure of water in the gas stream leaving the contacting zone will approach the vapor pressure of water above the particular brine fed to the contacting zone at the brine inlet temperature.

The accompanying drawing is a process block diagram showing two stages of gas-liquid contact and the associated refrigeration and heat exchange equipment.

A stream of wet gas, e.g., acetylene at ambient temperature and low pressure, is fed via line 10 to a first contacting zone 12. Zone 12 is a conventional vessel containing 1,500 to 3,000 mm of a suitable ceramic, plastic or metallic packing. A diluted cold brine is fed to zone 12 via line 14 and distributed over the packing by spray head 16. The wet gas and brine are intimately contacted in zone 12 and substantial portion of the moisture in the gas is condensed. The brine, containing water of condensation, is removed from zone 12 via line 18 and passed through heat exchanger 20 wherein it is cooled by the brine effluent of the second contact zone to be discussed below.

The cooled brine is then recycled via lines 22 and 14 to first contacting zone 12. If desired, the cooled brine from heat exchanger 20 may be further cooled by countercurrent heat exchange with the dry cold product gas to be discussed below. In this case valve 24 in line 22 is closed and the cooled brine from heat exchanger 20 passes via line 26 to heat exchanger 28. The cold brine from heat exchanger 28 is recycled via lines 30 and 14 to first contacting zone 12.

The partially cooled and dried gas from first contacting zone 12 passes via line 32 to second gas-liquid contacting zone 34. Zone 34 is similar to zone 12 in that it contains sufficient packing to provide intimate contacting of brine and gas and the brine is distributed over the packing by spray head 36. A cold stream of calcium chloride brine under −40°C is fed to second zone 34 via line 38 which originates in refrigeration system 40.

A dry cold gas product is removed from zone 34 via line 42 and passes to entrainment separator 44 wherein droplets of entrained brine in the gas stream are removed. The gas then passes via line 46 to heat exchanger 28 wherein it cools the warmed brine from the first contacting zone, if that brine is routed through exchanger 28. Thereafter it passes via line 48 to compressor 50 and is discharged via line 52 from the drying system.

Brine from second zone 34 passes via lines 54 and 56 to heat exchanger 20 and then passes via lines 58 and 60 to refrigeration system 40. This system may include any conventional refrigeration equipment. As shown it includes a compressor 62, condenser 64 and heat exchanger 66 wherein brine is cooled with the refrigeration medium.

After continuous operation has diluted the brine and raised the liquid inventory of the drying system, a portion of the dilute brine is purged via line 68. The brine concentration is then restored by adding concentrated brine to the system via any convenient connection.

The two-stage brine process permits a low pressure acetylene stream at 40 to 50°C containing 50 to 80 grams of water per cubic meter to be dried to a water content of less than 100 milligrams per cubic meter. Furthermore, since the drying takes place at low pressure, there is neither noticeable loss of acetylene in the brine, nor liquefying danger. As described, the contacting operation takes place with conventional equipment and a cheap readily available brine. There is a further advantage in that drying system operates at all times under the same conditions, so that consistent results are obtained.

We claim:

1. A multistage method for continuously drying a wet gas comprising the steps of feeding the wet gas to a first contact zone; contacting said wet gas in said zone with a first stream of cold inorganic brine to which said gas is inert, to partially cool and dry said gas; removing said first stream of brine from said first zone after contact with said gas; passing said partially cooled and dried gas from said first contact zone to a second contact zone; contacting said partially cooled and dried gas with a second stream of cold inorganic brine to further dry and cool said gas; removing said second stream of brine from said second contact zone after contact with said gas; passing said first and second streams of brine, after removal from their respective contact zones, through a heat exchanger wherein said second stream of brine cools said first stream; recycling said first stream of brine from said heat exchanger to said first contact zone; cooling said second stream of brine from said heat exchanger; and recycling said second stream to said second contact zone.

2. The process of claim 1 wherein the gas stream is wet acetylene and the brine is a solution of calcium chloride.

3. The process of claim 1 wherein the brine is reconcentrated by purging diluted brine from the drying system and adding concentrated brine thereto.

4. The method of claim 1 including the steps of, passing said first stream of brine from said heat exchanger to a second heat exchanger and passing said dried and cooled gas from said second contact zone to said second heat exchanger for heat exchange with said first stream of brine to further cool said first stream prior to recycling thereof.

5. The method of claim 1 wherein said wet gas and said first stream of brine are contacted countercurrently.

6. The method of claim 5 wherein said partially dried and cooled gas and said second stream of brine are contacted countercurrently.

* * * * *